Nov. 15, 1960　　　C. S. BURTCHAELL　　　2,960,007
MIRROR MOUNTING FOR VANITY CASES
Filed March 31, 1958　　　2 Sheets-Sheet 1
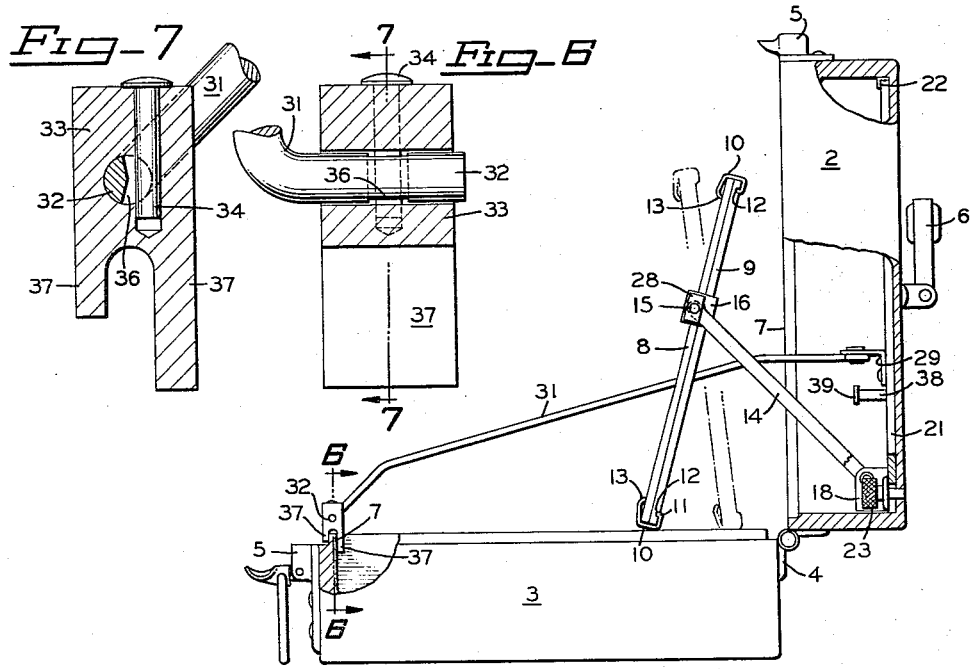
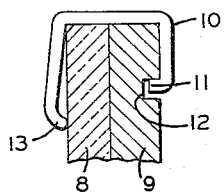
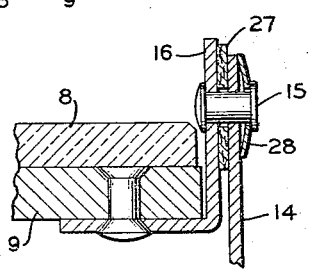
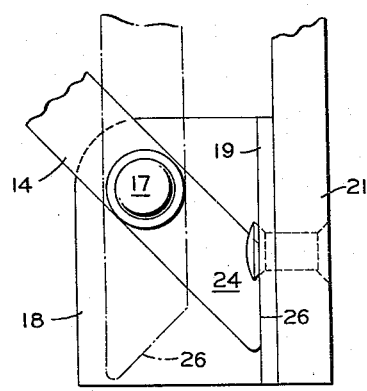
INVENTOR.
CLARENCE S. BURTCHAELL
BY Charles S. Evans
HIS ATTORNEY Nov. 15, 1960 C. S. BURTCHAELL 2,960,007
MIRROR MOUNTING FOR VANITY CASES
Filed March 31, 1958 2 Sheets-Sheet 2
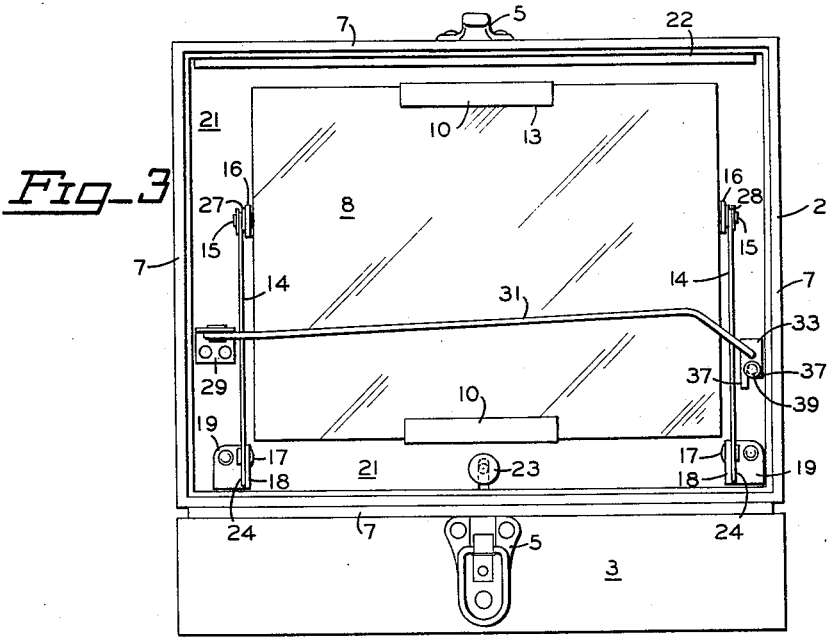
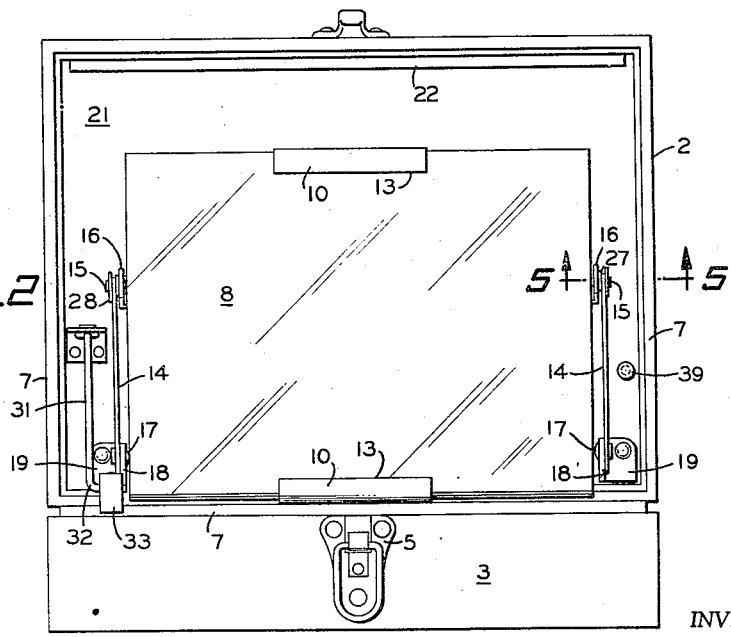
INVENTOR.
CLARENCE S. BURTCHAELL
BY Charles S. Evans
HIS ATTORNEY United States Patent Office 2,960,007
Patented Nov. 15, 1960

2,960,007
MIRROR MOUNTING FOR VANITY CASES
Clarence S. Burtchaell, P.O. Box 11, Ross, Calif.
Filed Mar. 31, 1958, Ser. No. 725,379
3 Claims. (Cl. 88—97)

My invention relates to vanity cases, and particularly to a mirror mounting structure for vanity cases.

One of the objects of my invention is the provision of a mirror mounting for vanity cases which permits movement of the mirror from a retracted position of disuse to an extended position of use.

Another object is the provision of a mirror mounting providing means by which the mirror may be selectively clamped immovably in its retracted position or released for movement relative to the cover and the cover propped in open position.

Still another object is the provision in a vanity case of a mirror mounting permitting relative movement of the mirror and mirror mounting.

A still further object is the provision of a mirror and mirror mounting structure assembled on a back plate detachably fixed within the cover portion of a vanity case.

The invention possesses other objects some of which with the foregoing will be brought out in the following description of the invention. I do not limit myself to the showing made by the said description and the drawings, since I may adopt variant forms of the invention within the scope of the appended claims.

Referring to the drawings:

Fig. 1 is a side elevation showing the vanity case open and the mirror in its released and extended position of use, and the case cover propped in open position. Portions of the case and mounting structure are broken away to disclose the underlying structure.

Fig. 2 is a front elevation of the vanity case with the parts positioned as in Fig. 1.

Fig. 3 is a front elevation of the vanity case with the cover open and showing the mirror clamped in its retracted position.

Fig. 4 is an enlarged fragmentary elevational view showing a portion of the mirror supporting bracket means pivotally mounted on the back plate.

Fig. 5 is an enlarged horizontal sectional view taken in the plane indicated by the line 5—5 of Fig. 2.

Fig. 6 is an enlarged vertical sectional view taken in the plane indicated by the line 6—6 of Fig. 1.

Fig. 7 is a vertical sectional view taken in the plane indicated by the line 7—7 of Fig. 6.

Fig. 8 is an enlarged fragmentary sectional view showing the mirror and backing plate binding means.

Figs. 1, 2 and 3 are drawn to a scale approximately one-third actual size, and Figs. 4–7 are enlarged approximately six times over Figs. 1, 2 and 3.

Broadly considered, my invention comprises a mounting structure adapted to support a mirror within the cover portion of a vanity case. Bracket means, pivotally mounted on a back or base plate detachably secured within the cover, provides a movable support for the mirror. The bracket and mirror are movable between a retracted position of non-use and an extended position in which the mirror may be selectively pivoted on the bracket to provide a further adjustment in accordance with the wishes of the user. Use of the mirror in its extended position is facilitated by a brace rod having one end pivotally supported by the cover and the other free end selectively engageable with the receptacle portion of the vanity case to prop the cover in open position. When the mirror is not in use, the bracket and mirror are retracted against the back plate or cover and the brace rod swung thereacross and its free end detachably secured to the back plate to clamp the mirror immovably within the cover. The cover may then be closed without interference from the mirror or its mounting. It will of course be understood that in vanity cases having a strong and rigid cover, the mirror mounting bracket elements may be fastened directly to the cover instead of to an intermediate back plate.

In more specific terms, the mirror mounting structure of my invention is designed to be fitted into the hollow hinged cover portion 2 of a vanity case having a hollow lower receptacle portion 3 in which vanity items may be carried. The vanity case is provided with hinges 4 to permit opening and closing of the cover, and cooperating lock means 5 to prevent accidental opening of the case while it is being carried, as by handle 6 on the cover. The edges 7 of the cover and receptacle are rabbetted to provide complementary overlapping edges helpful in forming a snug closure to exclude dust from the interior of the case.

In conventional vanity cases, there are two problems which inconvenience the user and limit the usefulness of the case. One of them is the difficulty of keeping the cover open while the mirror is being used, and the other is the inability to adjust the mirror to a desired position. Both of these difficulties have been obviated by the instant invention, in which a mirror 8 is mounted on adjustable bracket means comprising a mirror backing plate 9 to which the mirror is detachably fixed by resilient channel clamps 10, shown best in Fig. 8. Each channel clamp is formed along one of its edges with a perpendicularly extending integral flange 11 adapted to engage a groove 12 milled in the backing plate adjacent its top and bottom edges. The resilient channel clamp thus resiliently binds the mirror to the backing plate, and the flange 11 and groove 12 cooperate to prevent inadvertent displacement of the clamp. A bead 13 formed on the edge of the clamp opposite the flange 11 widens the range of applicability of the clamp to include mirror and backing plate combinations of varying thickness.

The backing plate, with mirror attached, is mounted on the cover 2 for movement relative thereto by means of spaced and parallel links 14, having corresponding ends pivotally connected by rivets 15 to lugs 16 fixed on opposite edge portions of the backing plate. The other end of each link is pivotally mounted by a rivet 17 on one leg 18 of a right angle bracket, the other leg 19 of which is riveted or otherwise secured to a base or back plate 21, detachably secured within the hollow cover by a marginal edge strip 22 and a thumb screw 23, shown best in Figs. 1 and 3.

It will thus be noted that the links 14 may be pivoted to a position substantially parallel with the cover 2 in order to place the mirror in a retracted position as shown in Fig. 3. From a retracted position, the links may be pivoted outwardly to the position shown in Figs. 1 and 4, pivotal movement being limited by link extensions 24 having angularly disposed end surfaces 26 adapted to abut the angle bracket leg 19. With the bracket links extended, the mirror is in position to be pivotally adjusted into a selected position as indicated by the dash lines in Fig. 1.

To insure that the mirror will remain at its adjusted position, the pivotal connection of each link with a lug 16 is provided with a friction washer 27, shown best in Fig. 5. Resilient pressure is maintained on the pivotal joint by a spring clip 28 caught under the head of the rivet 15.

Means are provided for clamping the mirror in its retracted position. Pivotally mounted at one end on a bracket 29 fixed on the back plate 21 adjacent one of the links 14 is a resilient brace rod 31. The free other end of the brace rod is provided with an integral right angle portion 32 on which is journaled a lock lug 33. A pin 34 in the lock lug cooperates with a groove 36 in the right angle portion 32 to retain the lug thereon. The parts are proportioned to permit limited pivotal movement of the lug. At its lower end, the lock lug is bifurcated to provide legs 37. The legs are spaced apart sufficiently to snugly receive the rabbetted edge 7 of the receptacle portion of the case when the brace is swung into the position shown in Fig. 1. When the brace is pivoted to the position shown in Fig. 3, the bifurcated lug is in position to detachably engage the shank 38 of a headed pin 39 fixed to the back plate on the opposite side of the mirror from the brace bracket 29.

The mirror and mirror bracket are thus clamped in retracted position by the resilient brace rod when the cover is closed, and the brace rod serves to prop the cover open when it is desired to use the mirror. Movement of the brace into its cover propping position automatically releases the mirror and mirror bracket for selective adjustment into a desired position of use.

I claim:

1. A mirror mounting structure for vanity cases having a receptacle portion and a cover portion hinged thereon, comprising a main base plate arranged to be detachably mounted on the cover portion, a mirror bracket movably mounted on the main base plate for movement between a retracted position and an extended position and including a mirror backing plate and spaced links pivotally interposed between the mirror backing plate and the main base plate, a mirror fixed on the bracket and movable therewith, a resilient brace rod pivoted at one end on the main base plate and movable to clamp said mirror and mirror bracket in retracted position, and a lock lug on the other end of the brace rod and movable therewith to releasably engage the main base plate to clamp the mirror in its retracted position.

2. The combination according to claim 1, in which said mirror and mirror backing plate are selectively adjustable on said links, and friction means are interposed between said mirror backing plate and said links to retain the mirror in adjusted position.

3. The combination according to claim 2, in which means are provided for resiliently and detachably binding together the mirror and mirror backing plate.

References Cited in the file of this patent
UNITED STATES PATENTS

| | | |
|---|---|---|
| 310,611 | Peck | Jan. 13, 1885 |
| 1,499,361 | Freund | July 1, 1924 |
| 1,908,831 | Edward | May 16, 1933 |
| 2,067,602 | Dorfman | Jan. 12, 1937 |
| 2,145,462 | Speck | Jan. 31, 1939 |
| 2,205,974 | Kramer | June 25, 1940 |
| 2,306,023 | Lumley | Dec. 22, 1942 |
| 2,461,421 | Jacobus | Feb. 8, 1949 |
| 2,555,717 | Turpin | June 5, 1951 |
| 2,582,593 | Kramer | Jan. 15, 1952 |
| 2,623,435 | Geis | Dec. 30, 1952 |
| 2,635,612 | Dean | Apr. 21, 1953 |
| 2,665,611 | Smith | Jan. 12, 1954 |
| 2,758,900 | Marchand | Aug. 14, 1956 |